3,845,027
PROCESS FOR PRODUCING ETHYLENE-
BUTADIENE COPOLYMERS
Salvatore Cucinella and Alessandro Mazzei, San Donato
 Milanese, Italy, assignors to Snam Progetti S.p.A.,
 Milan, Italy
Filed Oct. 26, 1972, Ser. No. 301,146
Claims priority, application Italy, Oct. 27, 1971,
30,362/71
Int. Cl. C08d 3/04; C08f 15/04
U.S. Cl. 260—85.3 R 4 Claims

ABSTRACT OF THE DISCLOSURE

A process is described whereby ethylene and butadiene are copolymerized to vulcanizable copolymers of high molecular weight and a high degree of crystallinity of polyethylene type at relatively high ethylene content by contacting those monomers with a catalyst prepared from and oxygen containing organic vanadium compound (e.g. $OV(OC_4H_9)_3$) and a metalorganic compound of aluminium (e.g. $Al(C_2H_5)Cl_2$) in the presence of an inert solvent at a pressure in the range from 1 to 150 atmospheres and a temperature in the range from $-30°$ to $150°$ C.

---

Figure 1:
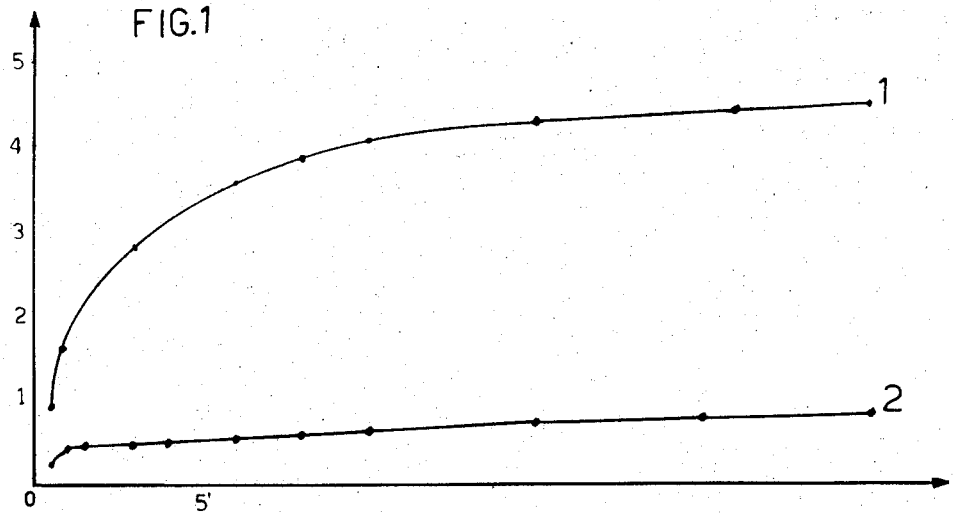

The present invention refers to a process for producing ethylene-butadiene copolymers and to the copolymers obtained thereby.

More particularly the present invention relates to a process for producing ethylene-butadiene copolymers by using binary catalysts, based on alkyl aluminium compounds and oxygen containing organic vanadium derivatives. It is known that some Ziegler catalyst systems usually employed are not able to yield such a type of copolymerization: in fact they generally give rise to mixtures of the two homopolymers, or to copolymers having a very low molecular weight, which possess a very poor homogeneity and such a distribution of unsaturations that they cannot be suitably cross-linked by sulphur. According to the present invention copolymers are obtained having high molecular weight, high degree of crystallinity of the polyethylene type at relatively high ethylene content, which moreover can be vulcanized by sulphur base recipes, by employing catalysts comprising:

(a) An oxygen containing organic vanadium compound, i.e. a compound wherein V—O—C bonds are present, as for instance OV $(OR)_3$, $V(OR)_4$, $V(OR)_3$ in which R may be an alkyl, aryl or cycloalkyl radical, or acetylacetonate derivatives as $OV(Ac)_3$, $V(Ac)_3$ in which Ac is the acetylacetone group;

(b) An aluminium compound having the formula $AlR'_xX_{3-x}$, wherein R' is an alkyl, aryl, cycloalkyl radical, or a hydrogen atom, X is a halogen atom and wherein $1 \leq x \leq 2$.

The molar ratio between aluminium compound and vanadium compound ranges from 1:1 to 30:1.

The resulting catalyst can undergo an ageing before being used, but this is not necessary.

The copolymerization is carried out in the presence of a solvent which can consist of an aliphatic, aromatic or cycloaliphatic hydrocarbon, and halogenated derivatives thereof, at a pressure ranging from one to 150 atmospheres and at a temperature ranging from $-30°$ to $150°$ C. At the end of the reaction, the copolymer can be recovered by usual methods, for instance by adding an aliphatic alcohol containing an antioxidant, and may be dried under vacuum before use.

The monomers can be introduced as a whole at the beginning of the reaction in the desired ratios; however it is advantageous to add firstly the fixed amount of butadiene and then to feed ethylene at constant pressure for the desired polymerization time, or to feed a mixture of the monomers at a constant composition during the polymerization run. It is preferable to mix the catalyst components in the presence of both monomers.

According to the starting composition of the monomer mixture, copolymers are obtained containing butadiene in an amount ranging from less than 1% to about 95% by moles (b.m.).

The butadiene unities in copolymer are in trans 1,4 configuration, or present an 1,2 configuration close to the trans 1,4 one: anyhow this latter is the predominating one.

The copolymer molecular weights, which are generally high, are calculated on the ground of the corresponding intrinsic viscosity, determined in Decaline at 135° C., generally up to 10; by varying the polymerization conditions it is possible to regulate the molecular weight until one obtains copolymers having intrinsic viscosity values lower than 1.

Generally the obtained copolymers are completely soluble in boiling toluene or some other hydrocarbon solvents having a higher boiling point, at temperatures close to the melting point of polyethylene, according to the absence of crosslinking before any vulcanization with sulphur is carried out.

The composition homogeneity is emphasized by the examination of the composition of the fractions obtained by subjecting the raw copolymers to a fractionation with the usual methods of macromolecular chemistry, which allow to separate and characterize a relatively high amount of fractions having different molecular weights.

The composition of copolymers containing butadiene up to 20% by moles is generally calculated from calibration curves obtained by correlating NMR analysis results and IR band intensities. Particularly use is made of relations between the content of trans 1,4 butadiene unities and the values of the ratios $D_{10.35\mu}/D_{13.90\mu}$ or $D_{10.35\mu}/D_{2.30\mu}$.

The $D_{11\mu}/D_{10.35\mu}$ is measured for determining the butadiene unities in 1,2 configuration. When studying copolymers having a butadiene amount equal to or higher than 20% b.m., use is made of the direct NMR analysis.

The X-ray examination of the copolymers at high ethylene content ($>95\%$) shows the presence of crystallinity of polyethylene type higher than 70% and generally close to 90%, whilst there is no crystallinity attributable to butadiene sequences. Crystallinity of polyethylene type and polybutadiene type can be observed in copolymers having a butadiene content equal to or higher than 20% b.m., the former being the predominating one.

The cross-linking of the ethylene-butadiene copolymers, generally performed on products having a low butadiene content ($<10\%$ b.m.), according to the present invention is proved:

(a) By the measurement of the gel amount caused by treating with sulphur and ascertained by subjecting copolymer, before and after the treatment, to a continuous extraction with boiling xylene;

(b) By the results of the compression tests, which are different before and after vulcanization. Evidences are so obtained of the greatest resistance to deformation of the copolymer after the vulcanization, according to the occurred cross-linking.

The copolymers having a low butadiene content have the same peculiar and very good properties of polyethylene homopolymer, after cross-linking with sulphur, and moreover present a higher thermal resistance.

The so obtained copolymers show a peculiar importance when applied in fields, wherein now use is made of more expensive materials, as the coating of cables for special uses, pipes for hot liquids, and generally materials having a particular resistance to solvents or vapours at high temperature, in the automotive industry and so on. Otherwise the cross-linking of the inventive copolymers may be carried out by employing peroxide compounds or radiations.

The cited copolymers can be employed also in oxidative demolition reactions which, by etching the double bond, can give rise to oligomers having oxygenated functions as terminal groups.

The following examples illustrate the invention, but are not limitative thereof.

EXAMPLE 1

Use was made of 1 l. stainless steel autoclave, provided with a rotary magnetic stirrer and an external jacket for controlling temperature through a circulating liquid from which air was removed; therein were introduced: 380 ml. of toluene wherein were dissolved mmoles 0.4 $OV(OC_4H_9)_3$ and 13.5 g. of butadiene.

Ethylene was fed at a pressure of 14.5 kg./cm.$^2$, and the temperature was kept at 15° C. Then mmoles 2.8 g. $Al(C_2H_5)Cl_2$ dissolved in 20 ml. of toluene were introduced by an ethylene pressure of 15 kg./cm.$^2$.

The polymerization was fast in starting, as was proved by temperature raising of 3.5° C. The polymerization mixture is kept stirring for one hour, at the temperature of 15° C. and pressure of 15 kg./cm.$^2$, this latter being regulated by connecting the autoclave to the cylinder wherefrom ethylene was fed. At the end the polymerization was terminated by adding methyl alcohol containing an antioxidant. The excess of the monomers was removed, and the atmospheric pressure was restored; an excess of methyl alcohol was added, acidified by HCl, and the copolymer, as a powder solid, was recovered by filtration, repeatedly washed by methyl alcohol containing an antioxidant and dried at 50° C. under vacuum.

32.5 g. of copolymer were obtained, which had a $D_{10.35\mu}/D_{2.35\mu}$ ratio at IR analysis, equal to 3.62, corresponding to a butadiene amount, linked in trans 1,4, ranging from 1 to 2% by moles (moreover there were present 1,2 butadiene unities in 0.08:1 ratio with respect to trans 1,4-unities). [$\eta$] in Decaline at 135° C. was 5.15. The crystallinity of the polyethylene type was 89%. Copolymer was completely soluble when extracted with boiling toluene for 50 hours. A portion of the product was cross-linked by hot-pressing at 200° C. for 30 minutes according to the recipe:

| | |
|---|---|
| Copolymer | 100 |
| Antioxidant 2246 | 1 |
| Zn oxide | 5 |
| Stearic acid | 1 |
| NOBS special (N - oxydiethylene-benzothyaryl-sulfuramide) | 2.5 |
| Vulcacit DM (dibenzothyaryldisulphide) | 0.5 |
| Sulphur | 1.5 |

Before and after cross-linking the copolymer was subjected (a) to an extraction with boiling xylene for 20 hours. The extraction residue was 0.6 before treating with sulphur; it was 69% after such a treatment;

(b) To compression tests on test-pieces having 6 mm. thickness. Particularly the test-pieces immerced in a silicone oil bath at the constant temperature of 200° C. were subjected to a head of 3.2 kg./cm.$^2$, and the flattening was measured versus time. The diagram of FIG. 1, wherein the flattening is reported as mm. (in ordinates) against time, shows a typical behaviour of such tests. It is clear the highest resistance is presented by the copolymer after vulcanization. The curve 1 refers to the copolymer as such, while the curve 2 refers to the cured product.

EXAMPLE 2

The copolymerization tests were carried out according to Example 1 and the following recipe:

| | |
|---|---|
| Toluene, ml. | 400 |
| $OV(OC_4H_9)_3$, mmoles | 0.4 |
| Butadiene, g. | 20 |
| Ethylene, kg./cm.$^2$ | 15 |
| $Al(C_2H_5)Cl_2$, mmoles | 2.8 |
| 1 hour at 15° C. | |

The yield as solid polymer was 17 g.

The copolymer contained 5.6% of trans 1,4 butadiene unities (the ratio between trans 1.4 unities and trans 1.2 unities was higher than 20:1), [$\eta$] in Decaline at 135° C. was 2.63. The X-ray crystallinity of polyethylene type was 89%. In order to ascertain the homogeneity of distribution of the butadiene unities, the copolymer was subjected to a fractionation at 135° C. by the column-extraction method, carried out according to the known features, non solvent; 79% butyl-cellosolve; 20% Decaline; 0.1% p-ionol solvent; 45% butyl cellosolve; 54.9% Decaline; 0.1% p-ionol. In such a way 20 fractions were separated at different [$\eta$] values, whose composition was in agreement with a sufficiently homogeneous distribution of trans 1,4 butadiene unities (Tab. 1).

Figure 2:
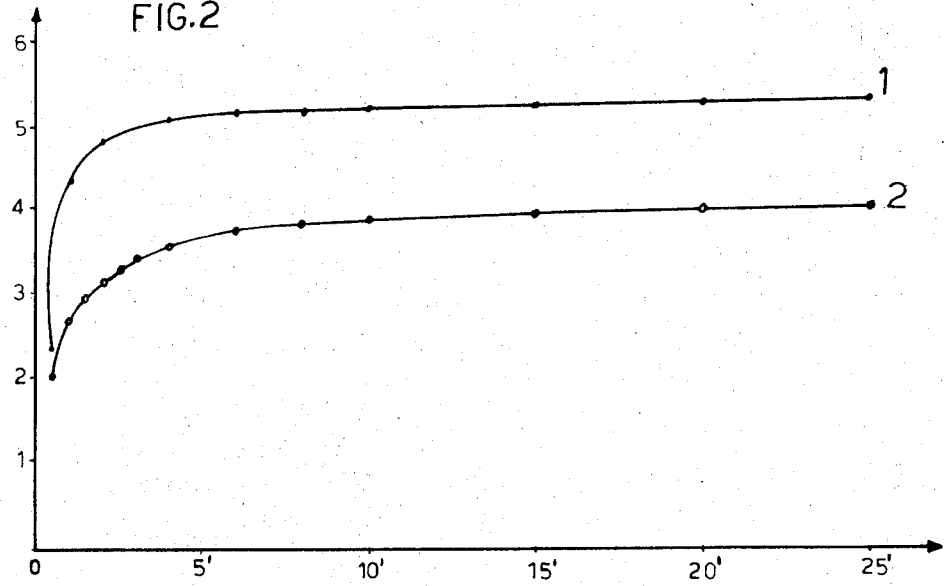

Moreover the copolymer was cross-linked with sulphur. Before such a treatment the copolymer was soluble in boiling xylene; after the treatment it was insoluble for 61%. FIG. 2 reports also the comparison of the resistance to compression, before and after treating with sulphur, which confirms the occurred cross-linking.

The curve 1 refers to the copolymer as such, whereas the curve 2 refers to the vulcanized one. In ordinates we reported mm., whilst in abscissae we reported time as minutes.

EXAMPLE 3

According to Example 1, a copolymerization test was carried out according to the following recipe:

| | |
|---|---|
| Toluene, ml. | 400 |
| OV(O-n $C_4H_9)_3$, mmole | 0.4 |
| Butadiene, g. | 13.5 |
| Ethylene, kg./cm.$^2$ | 15 |
| $Al(C_2H_5)Cl_2$, mmoles | 3.6 |
| 1 hour at 15+20° C. | |

The yield of solid copolymer was 35.5 g. The IR analysis showed a trans 1,4 butadiene unities content equal to 2.3% b.m. (furthermore the copolymer contained also 1.2 butadiene units, and the ratio between 1,2 unities and trans 1,4 unities was about 0.11:1). [$\eta$] at 135° C. in Decalin was 3. The X-ray crystallinity of polyethylene type was 90%.

At the extraction with different boiling solvents (50 hours per extraction) the copolymer was soluble according to the following percentages:

| | Percent |
|---|---|
| Ethyl ether | 2.5 |
| Benzene | 1.9 |
| Toluene | 91 | and the benzene and toluene extracts contained trans 1,4 butadiene unities practically equal to the ones of the raw copolymer. The cross-linking with sulphur caused 26% gel to be formed (measured by extracting with boiling xylene).

EXAMPLE 4

According to Example 1 the copolymerization test was carried out according to the following recipe:

| | |
|---|---|
| Heptane, ml. | 400 |
| OV(O-n $C_4H_9)_3$, mmole | 0.5 |
| Butadiene, g. | 10 |
| Ethylene, kg./cm.$^2$ | 15 |
| $Al(C_2H_5)Cl_2$, mmoles | 4.5 |
| 1 hour at 15° C. | |

The yield of solid copolymer was 16.5 g. The IR analysis showed a $D_{10.35\mu}/D_{2.35\mu}$ ratio equal to 2.34 corresponding to trans 1,4 butadiene unities close to 1% (1,2 butadiene unities are in a ratio of about 0.11:1 with respect to trans 1,4 unities). The X-ray crystallinity of butadiene type is 81%. $[\eta]$ at 135° C. in Decalin was 5.20.

Figure 3:
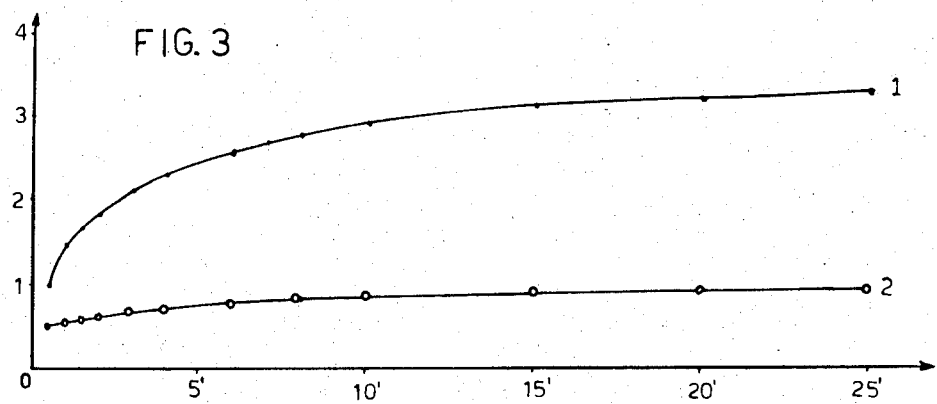

The occurred cross-linking after a treatment with sulphur was proved by the results of the compression tests reported in FIG. 3, wherein 1 and 2 refer to polymer as such and vulcanized polymer respectively.

EXAMPLE 5

According to Example 1 a copolymerization test was performed by employing the following recipe:

Toluene, ml. ---------------------------------- 400
$OV(O-n\ C_4H_9)_3$, mmole ---------------------- 0.4
Butadiene, g. -------------------------------- 90
Ethylene, kg./cm.² --------------------------- 15
$Al(C_2H_5)Cl_2$, mmoles ------------------------ 3.6
1 hour at 15° C.

5.2 g. of solid copolymer were obtained, containing 22.7% b.m. of butadiene unities, essentially linked in trans 1,4 configuration. The X-ray crystallinity was 80% comprising both the crystallinity of polyethylene type and polybutadiene type; the former predominated. $[\eta]$ at 135° C. in Decalin was 2.43.

EXAMPLE 6

According to Example 1, a copolymerization test was carried out by employing the following recipe:

Toluene, ml. ---------------------------------- 410
$OV(O-n\ C_4H_9)_3$, mmole ---------------------- 0.2
Butadiene, g. -------------------------------- 13.5
Ethylene, kg./cm.² --------------------------- 7
$Al(C_2H_5)_2Cl$, mmoles ------------------------ 1.8
1 hour at 15° C.

12.4 g. of solid copolymer were obtained. The IR analysis showed a $D_{10.35\mu}/D_{2.35\mu}$ ratio equal to 2.50 corresponding to a content of trans 1,4 butadiene unities equal to about 1% (there are also 1,2 unities in 0.18:1 ratio with respect to trans 1,4 unities). $[\eta]$ at 135° C. in Decalin was 6.24. The X-ray crystallinity of polyethylene type was 86%.

Figure 4:
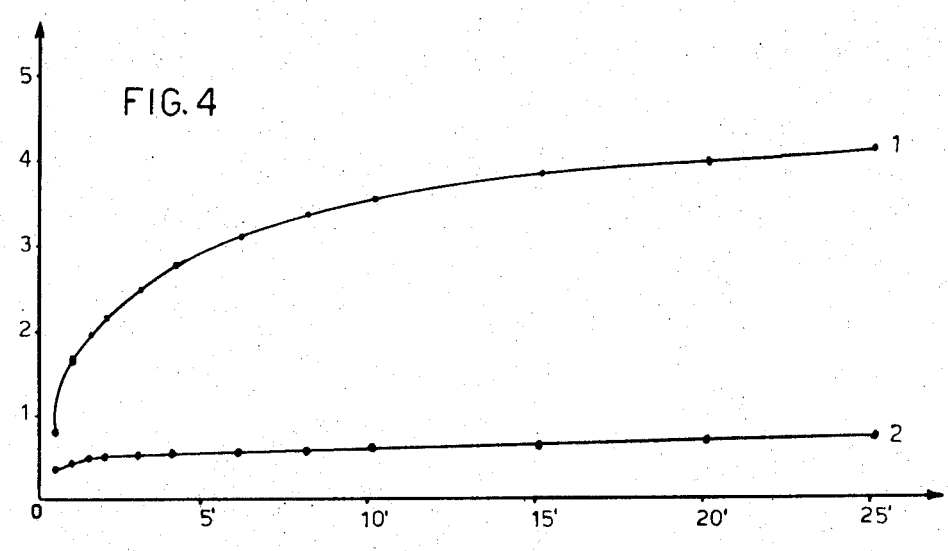

The copolymer was completely soluble when extracted by boiling xylene for 20 hours; after the cross-linking with sulphur, an insoluble residue remained equal to 65%. The results of the compression tests, before and after the cross-linking treatment (curve 1 and curve 2), reported in FIG. 4, confirmed the cross-linking to have occurred.

EXAMPLE 7

According to Example 1 a copolymerization test was carried out by employing the following recipe:

Toluene, ml. ---------------------------------- 400
$VAc_3$, mmole (Ac=acetylacetone group) -------- 0.4
Butadiene, g. -------------------------------- 13.5
Ethylene, kg./cm.² --------------------------- 15
$Al(C_2H_5)_2Cl$, mmoles ------------------------ 3.6
1 hour at 15° C.

9 g. of solid copolymer were obtained. The IR analysis showed a $D_{10.35\mu}/D_{2.35\mu}$ ratio equal to 1.07, corresponding to a butadiene content, linked in trans 1,4, lower than 1% b.m. $[\eta]$ at 135° C. in Decalin was 9.06. The X-ray crystallinity of the polyethylene type was 86%.

EXAMPLE 8

The polymerization test was carried out in a shaken stainless steel autoclave having a 0.750 l. capacity, which was equipped with an external jacket for cooling through a circulating fluid. According to Example 1, the test was carried out by employing the following recipe:

Heptane, ml. ---------------------------------- 400
$V(O-i\ C_3H_7)_4$, mmole ----------------------- 0.5
Butadiene, g. -------------------------------- 13.5
Ethylene, kg./cm.² --------------------------- 25
$Al(C_2H_5)Cl_2$, mmoles ------------------------ 4.5
80 minutes at 35° C.

38 g. of solid copolymer were obtained. The content in trans 1,4 butadiene unities was 3.5% (furthermore there are 1,2 butadiene units in a 0.1:1 ratio with respect to the trans 1,4 unities), $[\eta]$ at 135° C. in Decaline was 2.44.

Figure 5:
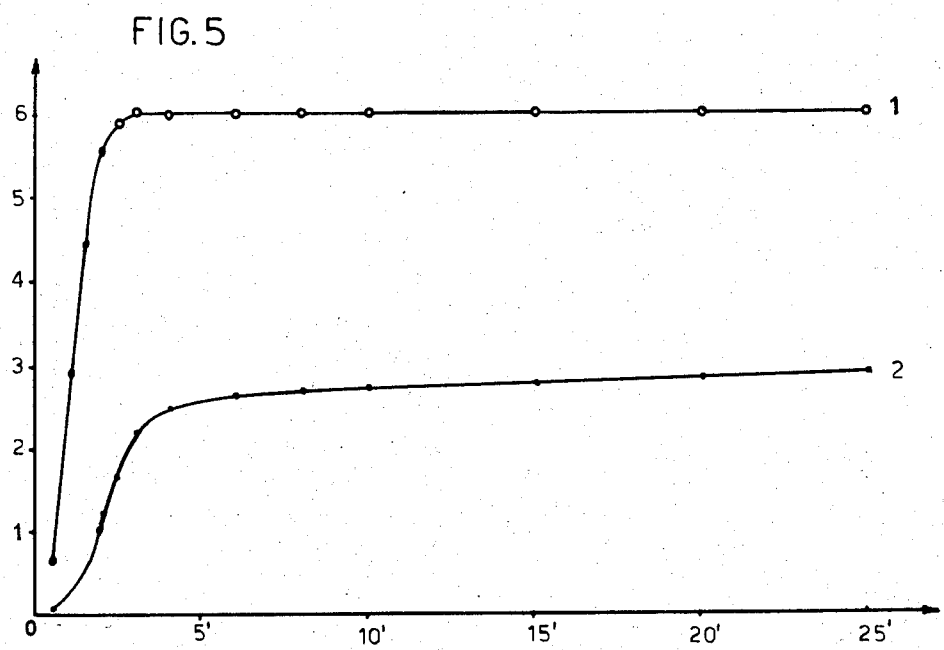

The copolymer was completely soluble in boiling xylene (extraction for 20 hours); after the cross-linking treatment with sulphur, the residue at the extraction with xylene is 37%. The evaluation of the resistance at compression, before and after the cross-linking treatment, reported in FIG. 5, confirmed the occurred linking. Also now the curve 1 refers to the copolymer as such and the curve 2 refers to the linked product.

EXAMPLE 9

According to Example 8, a copolymerization test was carried out by employing the following recipe:

Heptane, ml. ---------------------------------- 400
$V(O-i\ C_3H_7)_4$, mmoles ---------------------- 0.25
Butadiene, g. -------------------------------- 50
Ethylene, kg./cm.² --------------------------- 15
$Al(C_2H_5)Cl_2$, mmoles ------------------------ 2.25
80 minutes at 15° C.

5 g. of solid copolymer were obtained with a butadiene content, essentially linked in trans 1,4, equal to 25% b.m. $[\eta]$ at 135° C. in Decaline was 0.46.

TABLE 1

Fractionation data at elution gradient at 135° C. on the EBV 11 Br copolymer obtained by vanadyl butylate

| Fraction: | Weight (g.) | $[\eta]$ | $\dfrac{D_{10.35\mu}}{D_{13.95\mu}}$ | $\dfrac{D_{10.35\mu}}{D_{11\mu}}$ |
|---|---|---|---|---|
| 1 | 0.1378 | 0.28 | 0.85 | 5.2 |
| 2 | 0.0060 | 0.26 | 0.88 | 5.3 |
| 3 | 0.1198 | 0.31 | 0.84 | 5.8 |
| 4 | 0.1023 | 0.60 | 0.86 | 19 |
| 5 | 0.2078 | 0.61 | 0.78 | 20 |
| 6 | 0.1454 | 0.74 | 0.78 | 20 |
| 7 | 0.1466 | 0.80 | 0.87 | 20 |
| 8 | 0.1215 | | 0.78 | 20 |
| 9 | 0.1199 | 1.03 | 0.82 | 20 |
| 10 | 0.1543 | 1.30 | 0.81 | 20 |
| 11 | 0.1527 | 1.37 | 0.9 | 20 |
| 12 | 0.0906 | 1.69 | 1.0 | 20 |
| 13 | 0.1123 | 1.76 | 1.05 | 20 |
| 14 | 0.1043 | 2.17 | 0.99 | 20 |
| 15 | 0.1393 | 2.56 | 0.86 | 20 |
| 16 | 0.0309 | 2.33 | 0.82 | 20 |
| 17 | 0.0878 | Insoluble | 0.67 | 20 |
| 18 | 0.0842 | Insoluble | 0.52 | 20 |
| 19 | 0.0841 | Insoluble | 0.51 | 20 |
| 20 | 0.0658 | Insoluble | 0.87 | 20 |

What we claim is:

1. A process for preparing ethylene-butadiene copolymers, said process comprising copolymerizing ethylene and butadiene in the presence of an inert solvent, at a pressure ranging from 1 to 150 atmospheres, at a temperature ranging from −30° to 100° C. and in the presence of a catalytic system comprising.
   (a) an oxygen containing organic vanadium compound having V—O—C bonds selected from the group consisting of $OV(OR)_3$, $V(OR)_4$ and $V(OR)_3$ wherein R is an alkyl, aryl or cycloalkyl radical;
   (b) an aluminium compound having the formula $AlR'_xX_{3-x}$ wherein R' is an alkyl, aryl, cycloalkyl radical, or a hydrogen atom, X is a halogen atom and wherein $1 \leq x \leq 2$.

2. Process according to claim 1 wherein the molar ratio between aluminium compound and vanadium compound ranges from 1:1 to 30:1.

3. Process according to claim 1 in which the vanadium compound is $OV(OC_4H_9)_3$.

4. Process according to claim 1 in which the vanadium compound is $V(O\text{-}i\ C_3H_7)_4$.

References Cited

UNITED STATES PATENTS 3,711,455  1/1973  Cucinella et al. ---- 260—85.3 R

FOREIGN PATENTS 941,665    11/1963  Great Britain ---- 260—85.3 R
1,032,265  6/1966   Great Britain ---- 260—85.3 R
1,334,941  7/1963   France ---------- 260—85.3 R JOSEPH L. SCHOFER, Primary Examiner A. HOLLER, Assistant Examiner U.S. Cl. X.R.

260—79.5 C, 79.5 P, 85.3 C